(No Model.)

E. L. WOOD.
HOSE OR TUBING.

No. 368,364. Patented Aug. 16, 1887.

WITNESSES
Edwin T. Yewell,
Wm. F. Huntemann

INVENTOR
Edward L. Wood
By E. B. Clark
Attorney

UNITED STATES PATENT OFFICE.

EDWARD L. WOOD, OF HOBOKEN, NEW JERSEY, ASSIGNOR OF ONE-HALF TO CLARENCE B. SEWARD AND FRANCIS SHIPPEN, BOTH OF SAME PLACE.

HOSE OR TUBING.

SPECIFICATION forming part of Letters Patent No. 368,364, dated August 16, 1887.

Application filed April 27, 1887. Serial No. 236,338. (No model.)

*To all whom it may concern:*

Be it known that I, EDWARD L. WOOD, a citizen of the United States, residing at Hoboken, in the county of Hudson and State of New Jersey, have invented certain new and useful Improvements in Steam Hose or Tubing; and I do hereby declare the following to be a full, clear, and exact description of the invention, such as will enable others skilled in the art to which it appertains to make and use the same.

This invention relates to hose or tubing suitable for steam, hot water, and other fluids; and the object of the invention is to provide a flexible hose which shall be strong and durable, so as to safely stand a high pressure, which is a good non-conductor, to prevent radiation and loss of heat, and which will resist a high heat without becoming hard or stiff or becoming carbonized, but, on the contrary, will remain flexible and in good condition under varying temperatures. The objects sought are attained by constructing the hose or tubing according to my invention, as hereinafter particularly described with reference to the accompanying drawings, in which—

Figure 1:
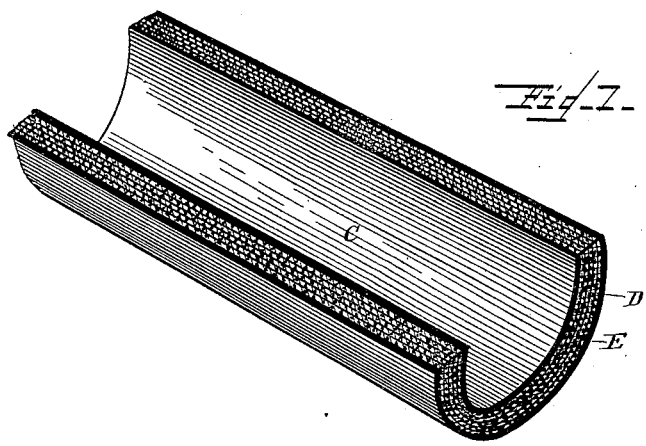
Figure 2:
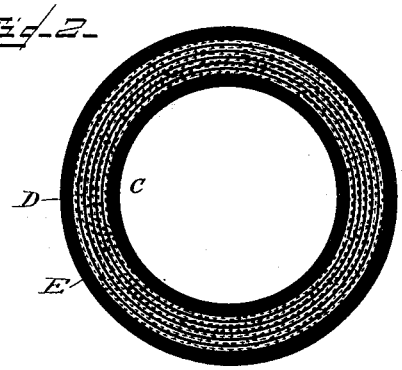
Figure 3:
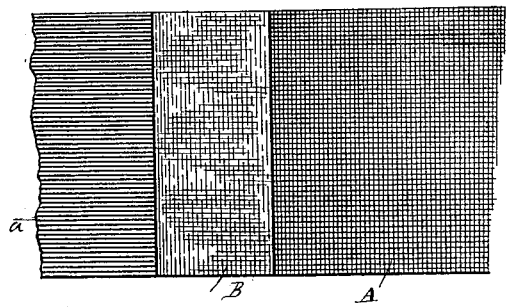
Figure 4:
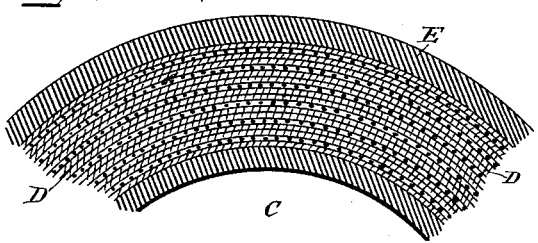

Figure 1 represents a longitudinal sectional view of the hose in perspective. Fig. 2 represents a vertical transverse section. Fig. 3 represents a plan or face view of one of the wire-cloth plies partially covered with asbestus or other heat-resisting and non-conducting coating. Fig. 4 is an enlarged sectional view of the hose.

In manufacturing my improved hose I use wire-cloth of fine or coarse mesh as best adapted to the purpose, and upon suitable lengths of such cloth roll an even layer of asbestus or equivalent material in the condition of pulp. This pulp may, if required, be rolled upon both sides of the cloth in order to completely cover it.

A represents the wire-cloth having one end covered with a thin even layer of asbestus pulp, B, coated thinly with rubber, *a*. The inner ply or layer, C, of the tube is composed of rubber in the usual manner, and upon this is wound, spirally or otherwise, the plies of asbestus-coated wire-cloth D, rolled thinly in rubber on one or both sides, which may be superimposed directly one upon another to any desired number of plies; or rubber in tubes or wound strips may be interposed between the plies of coated wire-cloth. An outer tube, E, preferably of rubber, is applied over the plies of wire-cloth and asbestus so as to form a smooth finish and protect the asbestus from abrasion and wear.

Asbestus made into pulp and rolled upon wire-cloth forms the most economical and convenient method of working it into hose, as it cannot be successfully applied in the form of strands or filaments to hose. This operation would be too laborious, and the asbestus in such unprotected form would not stand the wear to which hose is subjected. The wire-cloth furnishes not only a superior support and carrier of the asbestus, by which it can be economically and conveniently applied, but greatly strengthens the hose, so that it is enabled to stand a high pressure.

The asbestus acts as a non-conductor, to prevent loss of heat by radiation, and, besides, it is not carbonized and hardened by the heat. The hose made according to my invention is practically water-proof and fire-proof, and is well adapted for steam-pipes or air-brake pipes on cars.

I propose to use mineral wool instead of asbestus, or mixed with it and applied in the form of pulp to the wire-cloth.

The fabric herein described is not claimed in this application, as it is made the subject of a separate application for patent.

Having described my invention, what I claim, and desire to secure by Letters Patent, is—

1. A hose or tube having in its structure one or more plies of wire-cloth coated with a mineral fibrous non-conducting fire-proof material, substantially as described, for the purpose as set forth.

2. A flexible fluid-tight hose having in its structure one or more plies composed of wire-cloth and asbestus, as and for the purpose described.

3. A flexible fluid-tight hose having in its structure one or more plies of wire-cloth coated with asbestus pulp or equivalent non-conducting fire-proof material, for the purpose described.

4. A flexible fluid-tight hose composed of plies of rubber and asbestus-coated wire-cloth and having an outer covering of rubber or canvas to protect the asbestus, as and for the purpose described.

In testimony whereof I affix my signature in presence of two witnesses.

EDWARD L. WOOD.

Witnesses:
JAMES LAMB,
JOHN A. BROWN.